H. D. NICHOLLS.
GRINDING AND SHARPENING MACHINE.
APPLICATION FILED MAY 1, 1907.

969,649.

Patented Sept. 6, 1910.
3 SHEETS—SHEET 1.

H. D. NICHOLLS.
GRINDING AND SHARPENING MACHINE.
APPLICATION FILED MAY 1, 1907.

969,649.

Patented Sept. 6, 1910.
3 SHEETS—SHEET 3.

Witnesses:

Inventor
Henry D. Nicholls.
by his Attorneys,
Howson & Howson

UNITED STATES PATENT OFFICE.

HENRY D. NICHOLLS, OF PHILADELPHIA, PENNSYLVANIA.

GRINDING AND SHARPENING MACHINE.

969,649.

Specification of Letters Patent. Patented Sept. 6, 1910.

Application filed May 1, 1907. Serial No. 371,244.

*To all whom it may concern:*

Be it known that I, HENRY D. NICHOLLS, a citizen of the United States, and a resident of Philadelphia, Pennsylvania, have invented certain Improvements in Grinding and Sharpening Machines, of which the following is a specification.

My invention relates to grinding or sharpening machines, and consists of an improved apparatus of this general character designed for the purpose of rounding the teeth of metal cutting saws or milling tools.

Figure 1:
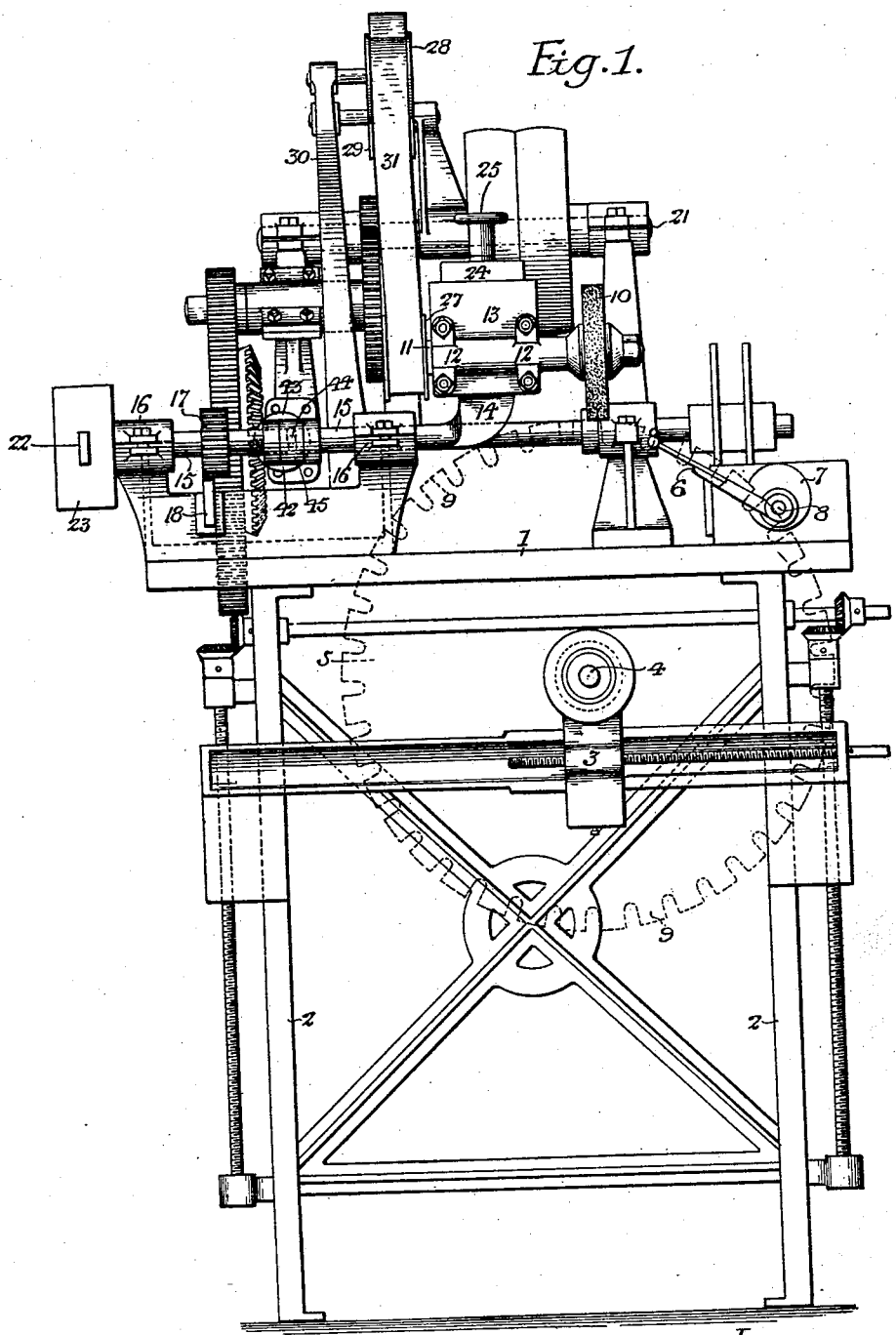
Figure 2:
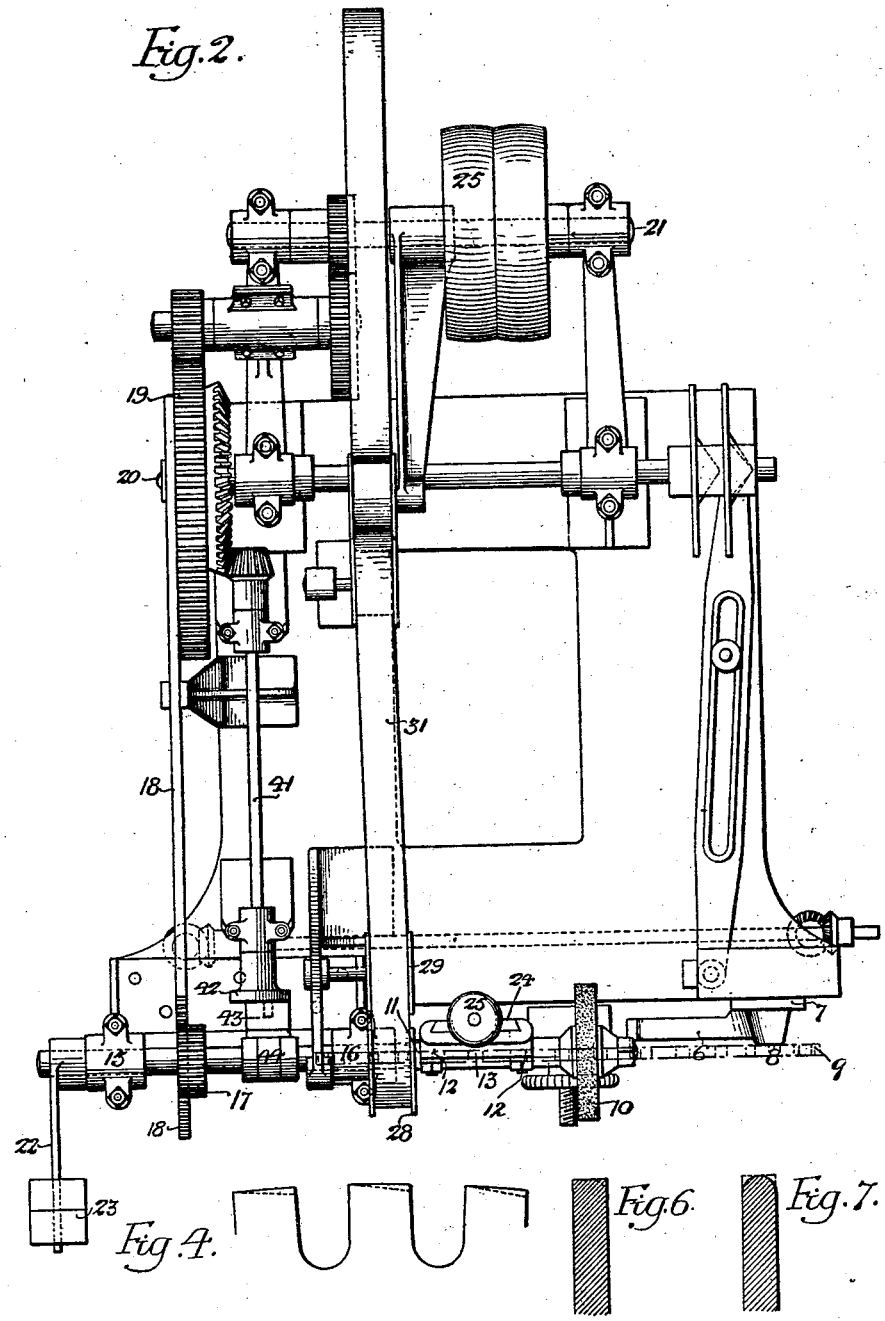
Figure 3:
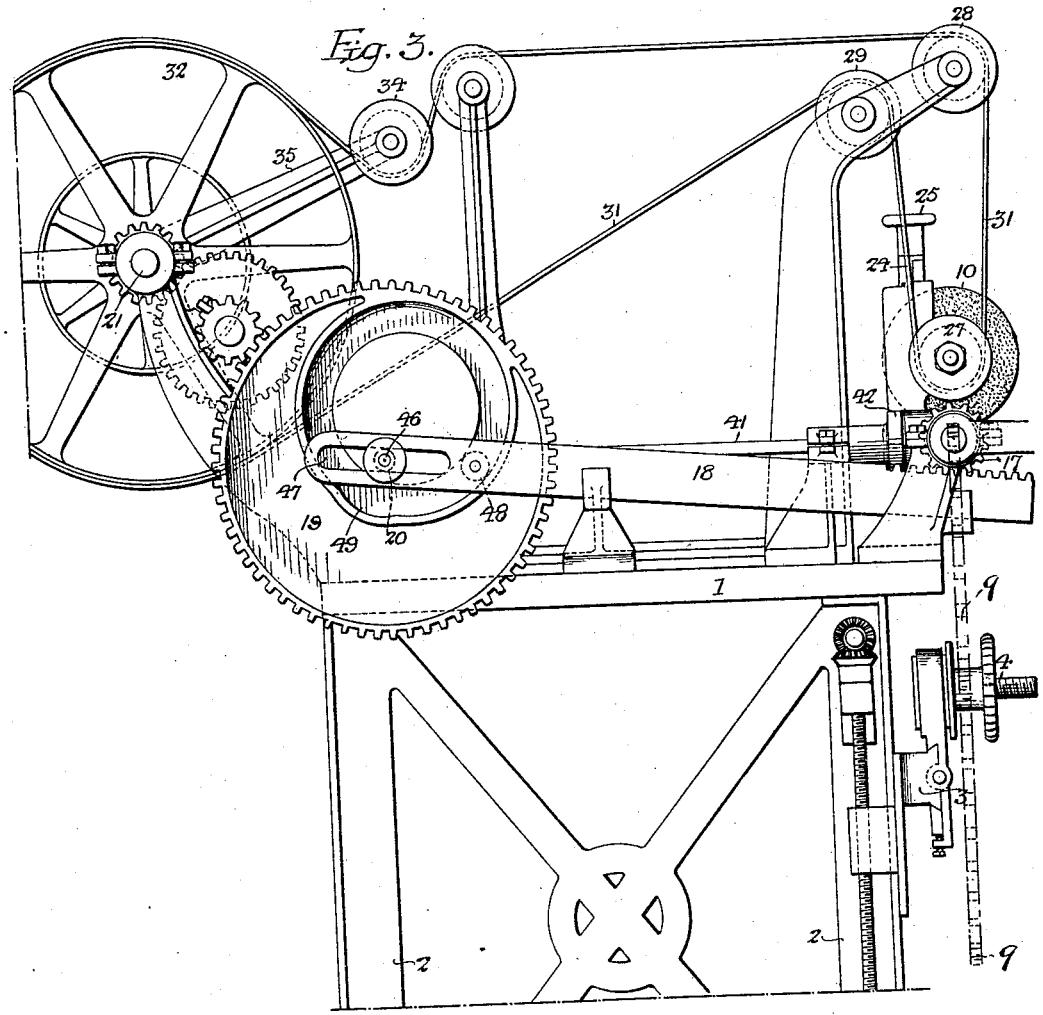
Figure 8:
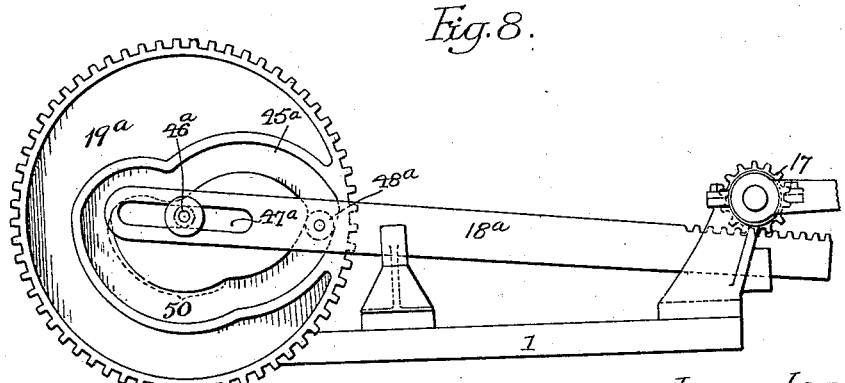

My invention is fully shown in the accompanying drawings, in which:

Figure 1, is a front elevation of a machine embodying my invention; Fig. 2, is a plan view of the same; Fig. 3, is a side elevation; Figs. 4, 5, 6 and 7, are enlarged views of the teeth of the saw or cutter illustrating the manner in which the same are ground, and Fig. 8, illustrates a modification.

The machine forming the subject of my invention consists of a bed or base plate 1, supported by a suitable framework 2, upon which is mounted an adjustable carrier 3, arranged to support a shaft or spindle 4 upon which the rotary saw or cutter 5 is mounted, (the latter being shown by dotted lines.) A finger 6, operated by suitable means; in the present instance being carried by a rotatable face plate 7 mounted on a driven spindle 8, is employed to move the saw or cutter the distance of one tooth at a time. This structure is commonly employed in connection with saw sharpening or grinding machines and forms no part of my invention. The outer edge or surface of each tooth 9 of the saw or cutter is to be engaged by an emery wheel 10 carried by a shaft or spindle 11 mounted in bearings 12; said bearings being carried by an adjustable member 13 whereby the emery wheel may be adjusted toward said edge of the saw, so that during the grinding action its engagement therewith may change as the squared edge of each tooth is reduced and gradually assumes a rounded contour. The adjustable frame 13 supporting the bearings 12 of the emery wheel is carried by the cranked end 14 of a shaft 15 which is rocked or oscillated back and forth by suitable mechanism to be explained hereinafter, for the purpose of moving or oscillating the rotating emery wheel around the entire edge of the saw, from a position on one side of the same with the cranked shaft at right angles to the face of the saw, to a position on the opposite side of the same with the cranked shaft in the same relative position. In addition to this movement imparted to the emery wheel carrier, the latter is also moved laterally by reciprocative movement imparted to the shaft 15 as the emery wheel is revolving so that the saw teeth are engaged from end to end of the same, and when finished will have a rounded face or edge that is beveled from the point to the heel of the tooth, on a line tangent to the arc of a circle struck from the center of the saw, the emery wheel being set to one side of a vertical line passing through the center of rotation of the saw, to effect the beveling as well as the rounding of the teeth.

The shaft 15 is mounted in bearings 16 in which it may be reciprocated, and carries a pinion 17 in operative engagement with a rack bar 18, suitably guided and driven by means of an eccentric or cam 19 mounted on a shaft 20 which is driven by suitable gearing from the main driving shaft 21. By this means the shaft 15 will be rocked or oscillated back and forth and the emery wheel carried by the frame mounted on said cranked member or shaft will be caused to engage the edge of the saw during such rocking or reciprocation and reduce said edge from one having a square section to one having a semicircular contour. The crank shaft 15 has an arm 22 at its end upon which counterbalance weights 23 are mounted.

The frame 13 supporting the shaft or spindle 11 on which the emery wheel 10 is mounted is arranged to slide on the way 24 formed on the extension 14 of the shaft 15 and adjustment of these parts to regulate the position of the emery wheel with respect to the saw or cutter is provided for by means of a screw, operated by a hand wheel 25. This screw is suitably anchored in the portion 14 of the cranked shaft 15 and engages a threaded part formed in the frame carrying the emery wheel. By this means the emery wheel may be adjusted from and toward the work. The center line of the journaled portions of the cranked shaft is in line with the center of the curvature to be imparted to the teeth by the grinding action, and means are preferably provided to limit the downward movement of the emery wheel so that it will finish the teeth uniformly. This stop member should be adjustable so that wear of the emery wheel may be compensated for.

To drive the emery wheel, its shaft 11 is provided with a pulley 27, and pulleys 28 and 29 are carried by a frame 30. To drive these pulleys a band or cord 31 is employed which passes from a driven pulley 32 mounted on the driving shaft 21 around said pulleys 27, 28 and 29; an idler pulley 34 being employed, carried by an arm 35 loosely mounted on the shaft 21, so as to take up any slack in the band or cord 31. The shaft 21 is driven from any suitable source of power.

The shaft 15 is reciprocable in its bearings during the rocking or oscillating movement, and the reciprocation is accomplished by the following means: Mounted in suitable bearings on the bed plate of the machine and disposed at right angles to the shaft 15, is a shaft 42 carrying a face plate 43 having a pin 44 in engagement with a vertically slotted member 45 carried by said shaft 15. As the shaft 42 is rotated, the face plate is rotated with it and the pin engaging the walls of the slot moves said shaft 15 back and forth in its bearings. By this means the emery wheel is traversed back and forth along each tooth simultaneously with its rotation, and as it is carried back and forth by the rocking or oscillation of the shaft 15. The rocking or oscillation of the shaft 15 is caused by the engagement of the reciprocating rack bar 18 with the pinion 17 mounted on said shaft. The cam plate 19 carried by the shaft has a groove 49 in its face. The center of this cam plate is provided with a pin 46, and the bar 17 is slotted at 47 to engage this pin and is provided with an anti-friction roller 48 in engagement with the cam slot or groove 49. As the cam plate rotates, the rack bar 18 is drawn back and forth and its toothed end being in engagement with the pinion 17, it rocks or oscillates the shaft 15, the connection and extent of movement being of such character as to prevent rotation of said shaft. The cam groove is provided with an offset portion 49 which serves to stop the rocking or oscillating movement of the cranked shaft for a length of time sufficient to permit the feeding of the saw one tooth at a time for the engagement of the emery wheel upon a fresh part. The saw is fed continuously one tooth for every revolution of the cam 19 and the grinding action takes place very gradually, such saw making probably twenty or more revolutions before the teeth are rounded to the extent desired. When finished the teeth will also be beveled from point to heel as clearly shown in Figs. 4, 5, 6 and 7, of the drawings, a condition due to the offsetting of the center of the saw with respect to the position of the emery wheel.

The machine just described is one designed for rounding each tooth of a circular milling saw or cutter, and such teeth are gradually rounded by rotating such saw continuously in such position as to be engaged by the emery or other sharpening wheel. There are, however, other types of milling saws or cutters, notably one in which every other tooth is left plain or square so that in making a cut by the use of a saw of this character, the rounded portion of the kerf made by the rounded teeth will be cleaned out by the square cutting edges or corners of the square teeth. For the purpose, therefore, of rounding the alternate teeth of such a saw as this, I provide the cam mechanism clearly shown in Fig. 8, in which means are provided for bringing the emery wheel frame into a vertical position so that the feeding mechanism designed to move the saw by engagement with the teeth will be able to effect such movement two teeth at a time, with the emery or other sharpening wheel in such position with respect to the saw that it will not act upon the squared edge. This movement may only take place when the emery wheel is directly above the teeth, for in such position there will always be sufficient clearance between such cutter and the teeth it is not desired to round. To permit this action, I employ a cam $19^a$, as shown in Fig. 8, which may be mounted on the shaft 21, and having a cam groove $45^a$, which is engaged by a roller $48^a$, mounted on the rack bar $18^a$, which is guided in a manner similar to the rack bar 18, and engages the pinion 17 to impart movement thereto. This rack bar is provided with a slot $47^a$ which is engaged by the pin $46^a$ on the end of the shaft 21. The groove $45^a$ of the cam $19^a$ is so proportioned and disposed as to operate the emery wheel in order to bring the latter in engagement with the saw teeth and effect the rounding of the same, and is further provided with a portion 50 which will cause such frame and the rocker or crank shaft to pause in a vertical position for a length of time sufficient to move the saw the distance of two teeth so that the emery wheel may always engage the proper teeth to be rounded, the alternate teeth being left in the original rectangular condition. When this form of cam mechanism is employed, the pusher arm and the eccentric for operating the same will be arranged to move two teeth instead of one, the eccentric being proportionately larger to effect this movement. In all other respects, this cam will operate the machine exactly the same as the cam shown in Figs. 1, 2 and 3, and the operation of grinding or sharpening the teeth is the same; the alternate teeth to be rounded being gradually reduced from their square shape to semi-circular shape, such reduction or grinding being made as the saw is rotated.

I claim:

1. In a grinding or sharpening machine, the combination of means for supporting the work to be operated upon, a grinding wheel mounted for rotation and arranged to engage said work, a cranked shaft supporting said grinding wheel, a pinion carried by said shaft, a racked member in operative engagement with said pinion whereby a rocking or oscillating movement may be imparted to the cranked shaft to cause the grinding wheel to engage the work in the arc of a circle struck from the center of oscillation, and means for operating said racked member.

2. In a grinding or sharpening machine, the combination of means for supporting the work, a grinding wheel mounted for rotation, a support for said wheel, a cranked shaft carrying said support, a pinion carried at one end of said shaft, a driving shaft, a grooved cam plate carried by said driving shaft, and a racked member suitably mounted for engagement with the pinion on the cranked shaft and having a portion in operative engagement with the groove of the cam whereby it may be actuated by the latter to give said cranked shaft a rocking or oscillating movement and cause the grinding wheel to engage the work in the arc of a circle struck from the center of oscillation.

3. In a grinding or sharpening machine, the combination of means for supporting the work, a grinding wheel mounted for rotation, a support for said wheel, a cranked shaft carrying said support, a pinion carried at one end of said shaft, a driving shaft, a grooved cam plate carried by said driving shaft, a racked member suitably mounted for engagement with said pinion on the cranked shaft and having a portion in operative engagement with the groove of the cam whereby it may be actuated by the latter to give said cranked shaft a rocking or oscillating movement and cause the grinding wheel to engage the work in the arc of a circle struck from the center of oscillation, and means for moving the work, said cam groove being so shaped as to provide for the stoppage of the cranked shaft by the racked member with the grinding wheel in a vertical position over said work to permit such movement.

In testimony whereof, I have signed my name to this specification, in the presence of two subscribing witnesses.

HENRY D. NICHOLLS.

Witnesses:
MURRAY C. BOYER,
JOS. H. KLEIN.